United States Patent [19]
Gutshall

[11] 3,993,397
[45] Nov. 23, 1976

[54] TILTING TERMINAL CLAMP ASSEMBLY

[76] Inventor: Charles E. Gutshall, 2911 E. State St., Rockford, Ill. 61108

[22] Filed: July 31, 1975

[21] Appl. No.: 600,886

[52] U.S. Cl. .............................. 339/246; 151/37
[51] Int. Cl.² .................................... H01R 9/10
[58] Field of Search ............ 339/95, 246, 269, 271, 339/272, 263, DIG. 2; 151/37

[56] References Cited
UNITED STATES PATENTS

| | | | |
|---|---|---|---|
| 2,270,813 | 1/1942 | Olson | 151/37 |
| 2,709,470 | 5/1955 | Knohl | 151/37 |
| 3,744,012 | 7/1973 | Gutshall | 339/246 |
| 3,891,296 | 6/1975 | Gutshall | 339/246 |

FOREIGN PATENTS OR APPLICATIONS

| | | | |
|---|---|---|---|
| 1,173,759 | 10/1958 | France | 339/272 A |

Primary Examiner—Joseph H. McGlynn
Attorney, Agent, or Firm—Merriam, Marshall, Shapiro & Klose

[57] ABSTRACT

A tilting terminal clamp assembly wherein the clamping plate associated with the threaded shank is generally circular and is equipped with serrations about the periphery for engagement with the sidewalls of a terminal body pocket, the clamping plate being chamfered about its central aperture to provide a four-point contact when engaging a wire in the pocket, the plate also being equipped with radially extending ribs outstanding from an annular groove to bightingly engage the wire.

12 Claims, 14 Drawing Figures

TILTING TERMINAL CLAMP ASSEMBLY

BACKGROUND AND SUMMARY OF INVENTION

This invention is an improvement on the terminal clamp shown and described in my earlier U.S. Pat. No. 3,744,012 which in turn makes reference to a number of earlier patents, all having to do with the securement of wires within a pocket of a terminal body — widely used in the electrical and electronics industries.

It will be appreciated that terminal connections are so widely used in every facet of life today, housing, commerce, industry, etc., that the numbers produced are virtually astronomical. It should also be appreciated that in the majority of instances, the terminal clamps are relatively small (less than ½ inch in diameter) so that hand assembly is not only difficult but time consuming. It would therefore be desirable to automate not only the installation of screw terminal clamps but also their manufacture — and while improving upon the reliability of the clamping function. More particularly, it is an object of this invention to provide a part that can be hoppered, picked up by the driver bit, transferred to the fixture having the electrical end product so oriented, drive the "screw", tighten the screw, and free the pickup grip of the driver as the driver recedes from the screw — all this being done on automated equipment not previously practical in the prior art. To achieve this end, I have incorporated a number of novel structures within a terminal clamp. Among these are the provision of a generally circular clamping plate equipped with serrations around the periphery adapted to engage rib-like structures on the sidewalls of the receiving pocket, thereby eliminating the need for carefully orienting the clamping plate during installation while at the same time preventing undesirable rotation (and possible loosening) when the clamp is installed. The clamping plate is equipped with unique chamfers which cooperate with unique annulets on the screw shank just under the head so as to develop a four point contact between the plate and the screw, wire and pocket. This results in an extraordinarily high degree of reliability of the installation as against inadvertent detachment. The clamping plate is maintained in place on the screw shank by means of a unique interrupted annulet spaced from the screw head which is conveniently provided incident to the thread forming operation. The clamping plate is further characterized by the provision of radially extending ribs outstanding from radially spaced grooves in the faces thereof to bightingly engage the wire or wires clamped thereunder and thereby insure permanence of installation. Still further, I provide a unique configuration in the driving aperture in the screw head which facilitates the use of automated equipment. The provision of these structures and the realization of the advantages derived therefrom constitute important objectives of this invention. Other objectives can be appreciated from the details of construction and operation set down in the enusing specification.

DETAILED DESCRIPTION

The invention is described in conjunction with the accompanying drawing, in which FIG. 1 is a fragmentary perspective view of a portion of a terminal body equipped with the tilting terminal clamp of the instant invention;

Figure 1:
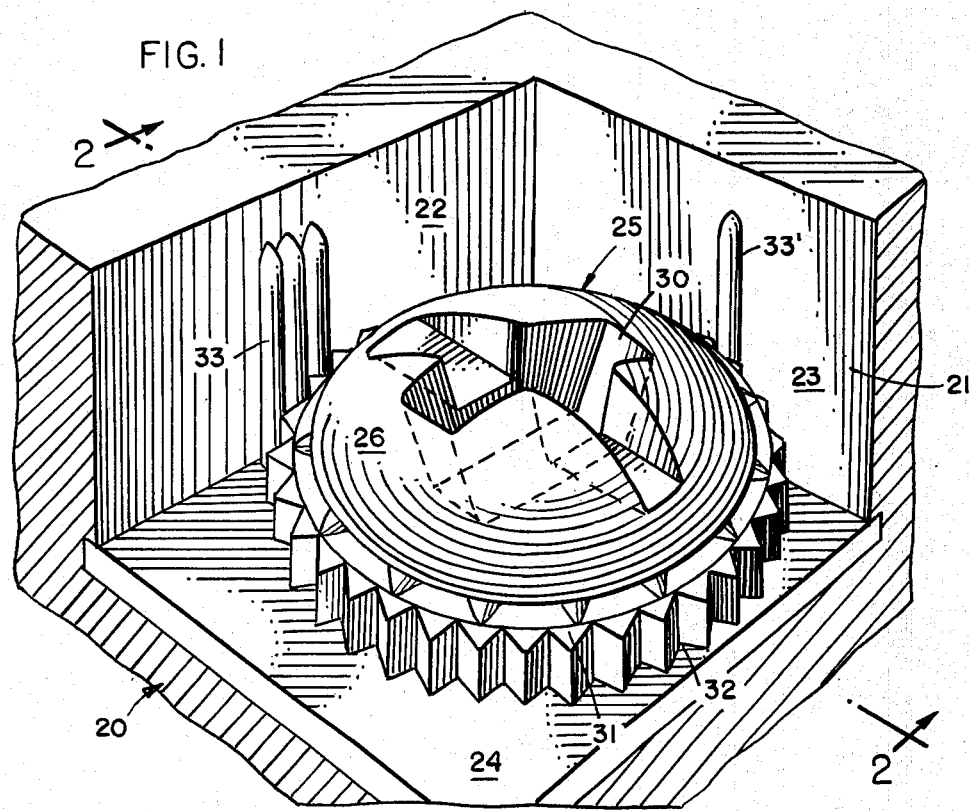

In the illustration given and with reference first to FIG. 1, the numeral 20 designates generally a portion of a terminal body, i.e., a fixture which is employed for securing electrical connections.

The terminal body 20 is equipped with a pocket 21 defined by sidewalls 22 (see also FIG. 2) and an endwall 23 all upstanding from a brass terminal plate 24, constituting the bottom wall of the pocket 21. Thus, the pocket is open at one end for the receipt of a wire W (see FIG. 3) and opened top for the introduction of the tilting terminal clamp generally designated 25.

The clamp 25 consists essentially of a screw 26, more precisely a threaded shank 27 (see FIG. 2) having a head 28 at its upper extremity. The threaded shank 27, at its lower extremity, is introduced into a threaded aperture 24a in the terminal plate 24 and extends into a bore 29 provided in the terminal body 20 and aligned with the threaded aperture 24a. The exposed portion of the head 28 is configured, i.e., equipped with a central opening 30 which cooperates with a tool for rotating the shank 27 into the threaded opening 24a.

Interposed between the head 28 and terminal plate 24 and mounted on the shank 27 is a clamping plate 31. This plate 31 has a generally circular perimeter which is equipped with circumferentially spaced apart serrations 32. The serrations 32 are rib-like structures which extend vertically, i.e., generally parallel to the axis of the shank 27. The serrations 32 cooperate with mating rib-like elements 33 provided on the opposed sidewalls 22 to prevent rotation of the clamping plate 31.

In the past, the clamping plates have been generally square or rectangular and thereby required orienting the square plate into the square pocket while assemblying the terminal in the electrical device. This necessitated the electrician or other artisan making the assembly to properly orient the clamping plate before making the installation. This vexatious manipulation is obviated through the use of the invention. For example, the electrician merely drives the assembled screw 26 and plate 31 directly into the pocket 31 without requiring any prior orientation. Thereafter, as before, the screw 26 is backed out, the wire W inserted, and the screw tightened. Because the inventive terminal plate is round or substantially round, a sharp yank on the wire W, after tightening the same, could possibly turn the plate which in turn could rotate the screw 26 and lossen the connection. This is precluded according to the invention because of the cooperation of the serrations 32 with the rib-like elements 33. The serrations and elements 32 and 33, respectively, are constructed to mesh randomly so that it is impossible to turn the clamping plate 31 about the axis of the screw shank 27.

Although I have illustrated the embodiment of the invention in terms of a vertically installed screw, it will be appreciated that this illustration and the terminology relating thereto, i.e., vertically extending, etc., are only for the purpose of illustration because it is well known that terminal pockets may be disposed in a variety of planes and directions. Further, it will be appreciated that the pocket configuration may not necessarily be square or rectangular but may have a curved end wall 23, for example. In the illustration given at FIG. 1, it will be noted that an additional rib-like element 33' is provided for additional immobilization of the clamp 25.

Figure 2:
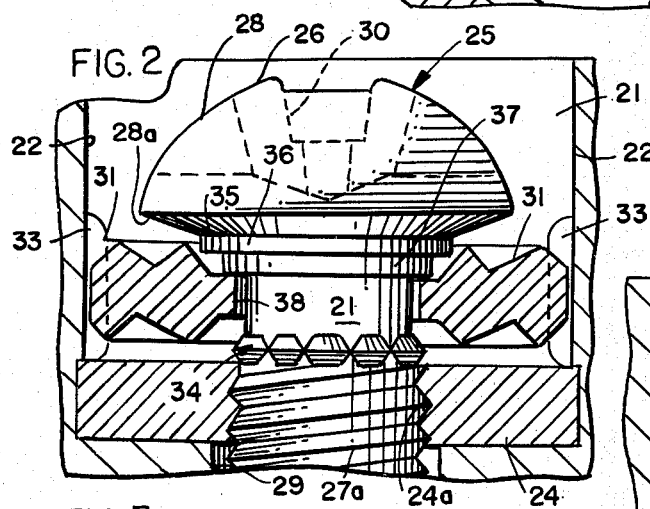
FIG. 2 is a cross sectional view such as would be seen along the sight line 2—2 applied to FIG. 1.
Figure 3:
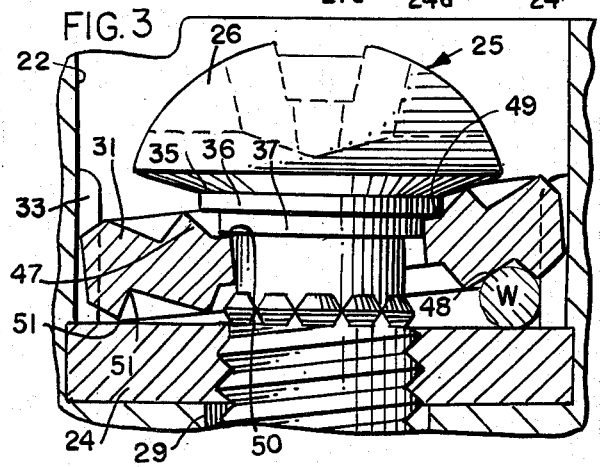
FIG. 3 is a view similar to FIG. 2 but with the parts thereof in an operational orientation, i.e., shown in the state of gripping a wire.
Figure 4:
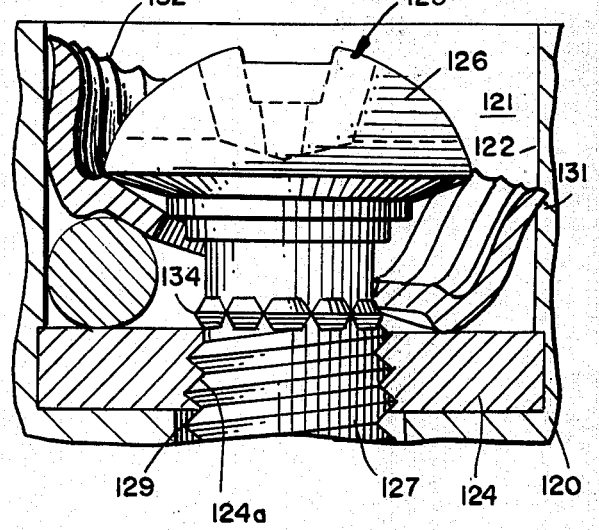
FIG. 4 is a fragmentary sectional view essentially similar to that of FIG. 3, but showing a modified version of the invention.

Another modification of the invention is illustrated in FIG. 4 wherein the inventive clamp is generally designated by the numeral 125 and is seen to be received within a pocket 121 of a terminal body 120. As before, the shank 127 of the screw 126 is received within a threaded aperture or bore 124a in the terminal plate 124. Differing from that shown in FIGS. 1-3 is the construction of the clamping plate 131. In the embodiment of FIG. 4, the clamping plate is a cupped or deep drawn type which is constructed with sufficient height, and will, when tipped or tilted as shown, bite into the sidewall 122 of the plastic dielectric material normally used in terminal bodies. In this case, the perimeter of the cupped plate 131 is equipped with serrations in the nature of flutes or ribs as at 132 and these serve the function of selectively penetrating the sidewalls 122 to eliminate the need of the rib-like elements 33 of the embodiment of FIGS. 1-3.

In either event, i.e., in both the embodiments just referred to, I employ an improved version of the structure illustrated in my earlier U.S. Pat. No. 3,744,012 for maintaining the clamping plate 31 or 131, as the case may be in position on the shank 27 of the screw 26. As can be readily appreciated from a consideration of FIG. 2 or FIG. 4, the clamping plate is confined between the underside of the head 28 of the screw 26 and an interrupted annulet generally designated 34, or 134 as the case may be.

By annulet, I refer to the architectural construction ordinarily associated with the capital of a column. For example, in FIG. 2, the underside 28a of the head 28 is seen to merge into a first annulet 35 which, when proceeding downwardly as illustrated, merges into a second and smaller diameter annulet 36 which in turn merges into a still smaller and lower annulet 37. The function of these upper annulets will be described in greater detail hereinafter but it will be appreciated from a consideration of FIG. 3 that these annulets provide unique bearing points for the clamping plate 31 when the plate 31 is in a tilted condition.

Figure 5:
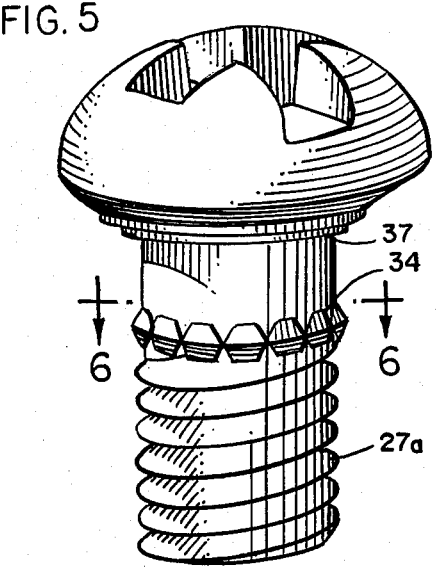
FIG. 5 is a perspective view of the screw portion of the inventive terminal clamp.
Figure 6:
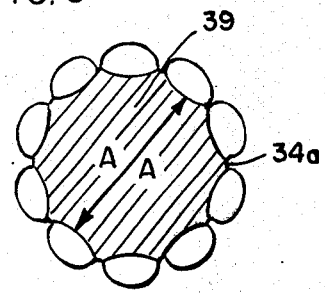
FIG. 6 is a sectional view such as would be seen along the sight line 6—6 applied to FIG. 5.

Spaced below the lowest annulet 37 is the interrupted annulet 34 which could be considered a series of projections and depressions. These maintain the clamping plate 31 attached to the screw 26 so that when the screw is reversed, the interrupted annulet 34 causes the plate to lift and thereby makes it possible to either insert or remove the wire W, as the case may be. Advantageously, the plate 31 has a central aperture 38 of the Sems type and is dimensioned just large enough to permit the insertion of the screw blank, i.e., the screw 26 before the shank 27 has had the threads 27a rolled thereon (see FIG. 5). For example, a nominally sized screw may start with a blank having a shank diameter of 0.115 inch. As a result of the roll threading operation — as developed by the dies depicted in FIG. 7, the major diameter of the completed threads is approximately 0.140 inch with the minor diameter being correspondingly smaller. By providing an interrupted annulet 34 of about the same diameter as the annulet 37, I insure that the diameter even of the depressed portions 34a (see FIG. 6) are greater than the minor diameter of the threaded portion 27a. Thus, the column strength of the screw 28 is enhanced by not reducing the blank or shank all around its periphery to the threaded minor diameter. This provides a much stronger abutment than the normal round bottom grooves produced incident to the thread rolling. Even though the normal round bottom grooves create an annular ridge to retain the clamp 31, such grooves, by penetrating the shank blank to the thread minor diameter, weaken the screw considerably. In FIG. 6, the thread minor diameter is designated by the numeral 39 and it will be seen that the minimum diameter of the interrupted annulet 34 — as at 34a, is larger and thereby provides a stronger column than if the blank were embossed to a full circle of the diameter 39.

Figure 7:
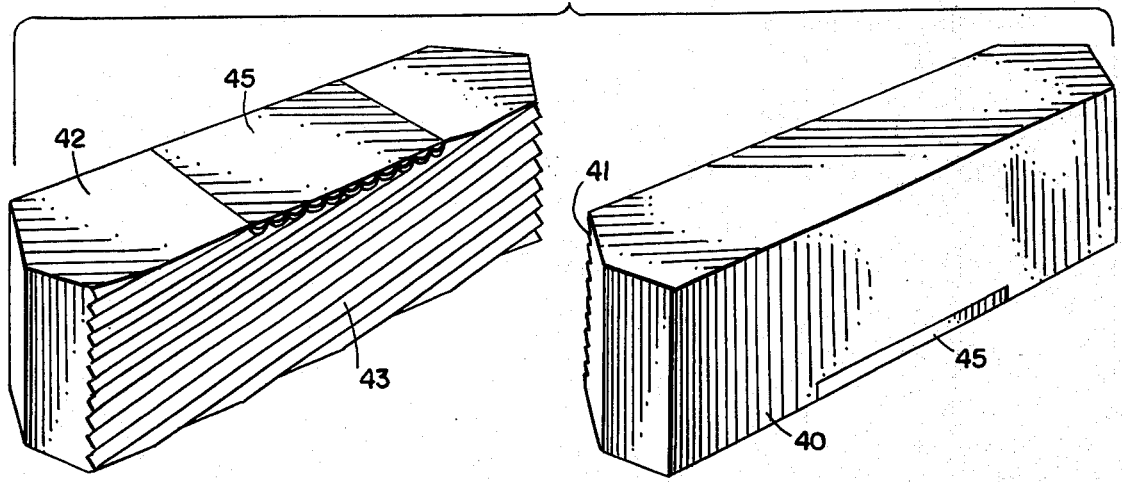
FIG. 7 is a perspective exploded view of thread rolling dies.
Figure 8:
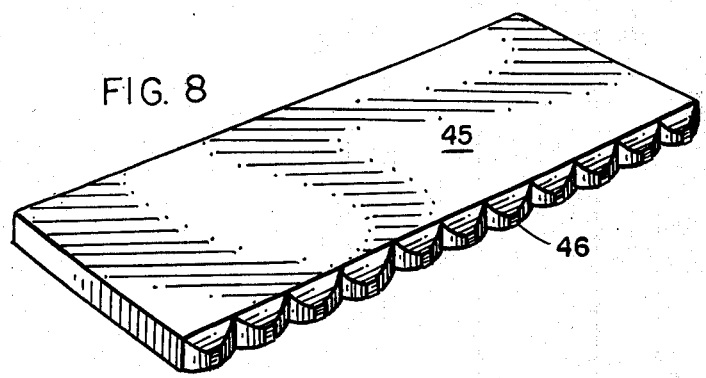
FIG. 8 is an enlarged perspective view of an insert portion of the stationary die of FIG. 7.

In the manufacture of the inventive tilting terminal clamp, the screw blank is equipped with the various annulets 34-37 and the interruption of the annulet 34 (spaced a suitable distance below the annulet 37) is achieved by the thread rolling die seen in FIG. 7. Illustrated schematically in FIG. 7 and seen at the right hand side thereof is a conventional reciprocating die 40 equipped with thread forming teeth 41. Cooperating with the die 40 is a stationary die 42 equipped on one face thereof with teeth 43. The extreme upper portion of the die 42 is recessed as at 44 and receives an insert 45 (also seen in FIG. 8) which has interrupted teeth of serrations as at 46 so as to develop the interrupted annulets at the same time the threads 27a are formed in the screw blanks. However, by the arrangement shown the interrupted annulet conforms to the basic thread angle of 60° whereby even the annulet 34 is adapted to enter the tapped hole 24a without stoppage.

Figure 9:
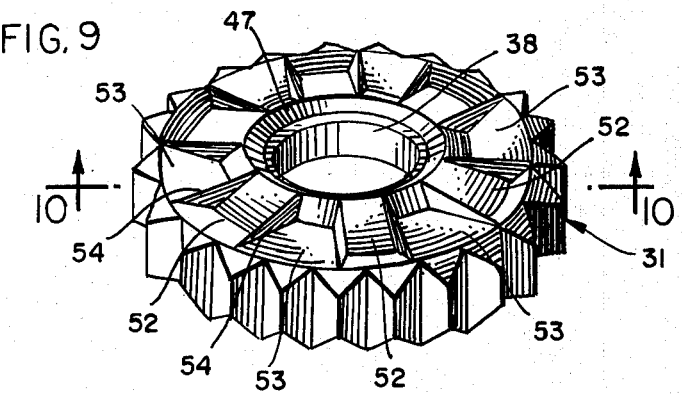
FIG. 9 is a perspective view of the clamping plate portion of the tilting terminal clamp.
Figure 10:
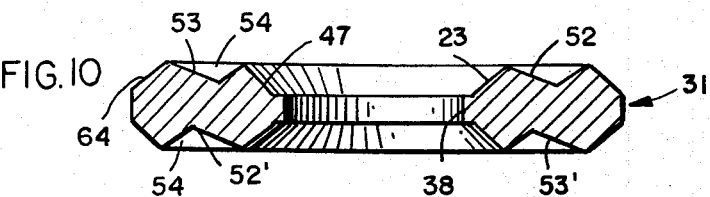
FIG. 10 is a sectional view such as would be seen along the sight line 10—10 applied to FIG. 8.
Figure 11:
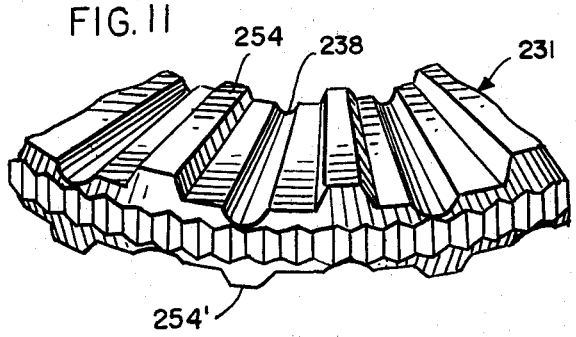
FIG. 11 is a perspective view of a modified form of clamping plate.

Turning now to FIGS. 9-11, the details of the clamping plate 31 will be discussed, it having been described how the clamping plate 31 is installed and maintained in place on the screw 26. Referring now specifically to FIG. 9, the clamping plate 31 is seen in perspective and again has a generally washer-like configuration, i.e., being equipped with a central aperture 38. Adjacent the aperture 38 is an annular chamfer 47 which cooperates with the annulets 35-37 in the fashion seen in FIG. 3 to secure a wire W. It will be appreciated that a characteristic requirement of tilting terminals is that they must tip angularly when only one wire is placed under one side of the clamping plate. The plate 31 must tip relative to the screw 26, as shown in FIG. 3. Normally the degree of angularity is within 15° and under such conditions, the plate provides great axial pressure upon the wire W relative to any applied torque. This is achieved according to the invention, and still referring to FIG. 3 through the development of four pressure or contact points. First, the underside of the clamping plate 30 bears against the wire as at 48.

A second pressure or contact point is at 49 which exists between the chamfer 47 and certain of the annulets 35–37. A third load point 50 is on the opposite side of the screw 26 from the pressure point 49 and again, exists between the chamfer 47 and certain of the annulets 35–37. The fourth contact point is seen at 51 in FIG. 3 and exists between the lower bottom of the clamping plate 31 and the terminal plate 24 of the pocket 21, This condition of solid four point loading precludes loosening of the wire from shocks or accidential pulling. When the plate 31 is hardened and tempered, this four point loading places trapezoidal loading (by virture of the plate configuration to be described) and acts to take up loss of clamp forces which could occur by loss through cold flow of the wire.

Still referring to FIG. 9, the numeral 52 designates a series of spaced apart wedge-shaped depressions in the face of the clamping plate 31. Interspersed between the depressions 52 are depressions 53, the depressions being separated by radially extending ribs 54 (still referring to FIG. 9) which, in effect, outstand from the depressions 52 and 53. The ribs 54 tend to abrade into the clamped wire W and remove any patina from the wire in the process, thereby increasing conductivity as well as penetration and therefore locking action. The relationship of the depressions 52 and 53 can be appreciated by comparing the top and bottom depressions as seen in FIG. 10. The bottom side of the plate 31 is equipped with complementary depressions 52' and 53' and also with ribs 54. The apices of the depressions 52 and 52' are radially outward of the apices of the depressions 53 and 53'. By offsetting the apices of the depressions 52, 52' relative to the apices 53', 53, i.e., by placing the same at different radial distances, I avoid thinning of the plate which would be the case if all the apices were vertically aligned. It will also be noted that the apices 52 and 53 are formed by intersecting angled walls that tend to draw the wire inwardly under the clamping plate 31 and thereby add stability during the locking process.

Figure 12:
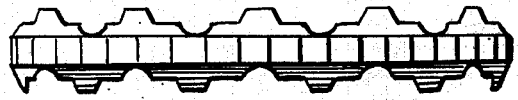
FIG. 12 is a side elevational view of the plate of FIGS. 8 and 9.

A modified form of plate is seen in FIGS. 11–12 where the plate 231 is equipped with a central aperture 238. However, the depressions are no longer angled, but offset top and bottom to offset the ribs 254 and 254'.

Through the provision of the reversible clamping plate 31 as illustrated, it is possible that the normal assembly rate of the square type plate of 150 pieces per minute can be doubled.

Figure 14:
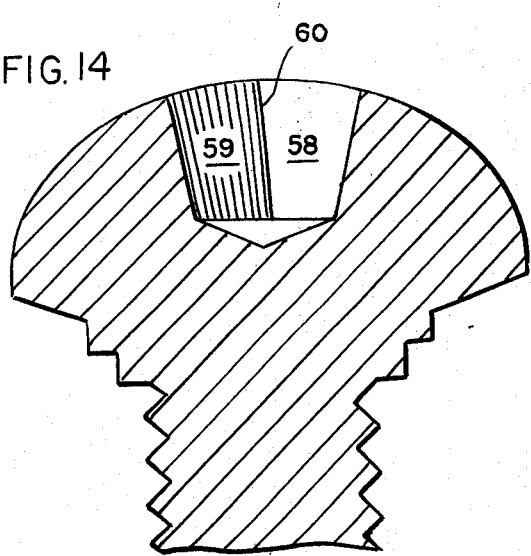
FIG. 14 is a sectional view such as would be seen along the sight lines 14—14 of FIG. 13.
Figure 13:
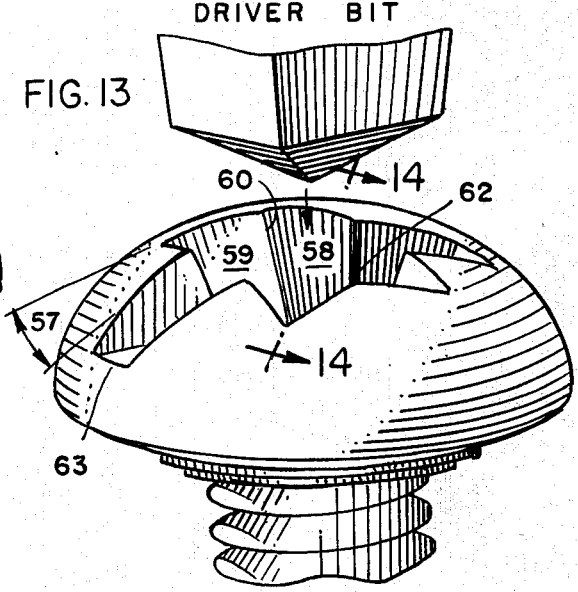
FIG. 13 is a fragmentary perspective view of the screw portion of the inventive clamp with a driver bit associated therewith and illustrating the means for installing the clamp assembly.

Another novel feature of the invention and which facilitates automation is the driver bit aperture 30 as seen in greater detail in FIGS. 13 and 14. This is a modification of the Robertson pyramidal or square drive recess wherein the sidewall at each corner as at 57 is angled to enable the standard square driver to rock or turn slightly at tightening torque so that the driver frees itself from the taper friction mating grip with the recess. This friction taper fit is desirable when picking up the screw terminal by the driver through friction and also to effectuate the transfer of the screw terminal to its assembly fixture. Yet, by providing the angularity between the walls 58 and 59 along the line of intersection 60, this permits the driver to become free after driving the screw 26 into place so that when the driver bit (see FIG. 13) is withdrawn the whole complete assembly is not withdrawn at the same time — thereby avoiding damage. More particularly, this is accomplished by the angle developed along the line of intersection 60 whereby the sidewall of the bit receiving opening 30 is divided into two unequal portions. The portion 58 is the smaller and is square with corresponding portions in the other sidewalls of the bit opening 30. The larger area 59 is, as indicated, at an angle 57 to the portion 58, i.e., the square portion, and provides the space for the driver bit to rock into and become free after torque application. The line of intersection 60 is parallel or similarly angled to the driving corner of the bit receiving recess 30 so that the matching tapers of the driver and recess lessens as the recess depth increases. When providing such a recess 30, it is normally impossible to eliminate all of the "flash" along the line of intersection 60, such flash being designated by the numeral 62 and this ultimately folds over to further reinforce the grip of the driver bit 61 with the walls of the recess 30.

In the practice of the invention, the clamping plate 31 is assembled on the blank which ultimately becomes the screw 26. No screw thread alteration is required, an annulet 34 being spaced below the stepped annulet 35–37. Even when indented to provide the interrupted annulet seen in FIGS. 5 and 6, there is substantial column strength over the prior art construction which made use of the thread minor diameter as a portion of the plate supporting means. Most of the prior art plate supports were circular at the root while the interrupted annulet of the inventive clamp is fluted to yield additional strength. However, no thread loss results and the inventive clamp has threads closer to the plate than prior art constructions, yet still permits greater tilting. Through the provision of the interrupted annulet 34, the plate 31 is readily liftable along with the screw and positively follows the screw when the screw is loosened for wire insertion. The positive shoulders and columnar lift ring 34 of the inventive clamp are stronger and require less clearance than prior art tilting terminal clamps.

The clamping ring 31 is substantially circular (optimally 24 sides) and therefore will drive instantly into any barrier pocket 21 without preorientation. The peripheral chamfers aid in permitting the plate to enter pockets which are undersize, or the tapped hole is off-center, and the relatively sharp peripheral teeth shear or swage mating grooves as the washer is screwed down into its pocket. This permits square pockets to accept this invention and keep the plate from rotating by merely having the pocket a bit smaller than the plate and utilizing this shear-in fit to advantage. The plate 31 does not rotate under wire pull because the plate is, in effect, geared to the product pocket walls 22 even more positively and with less mismatch than a square plate in a square pocket. The screw heads 28 by virtue of the unique tool recess 30 can be automatically power driven without holders, magnetics, catchers, manual dexterity or other stationary equipment, yet used with standard tools by the electrician. Another option available is that the access opening 30 for the drive bit may be enlarged through the provisions of a standard screw driver slot 63 (see FIG. 13) so that the final electrician hookup needs no special driver tool.

The inventive plate 31 will tilt automatically to accommodate one wire clamped on one side or will tip to clamp equally a 0.050 inch diameter wire on one side and a single strand of 0.013 inch diameter wire opposite the 0.050 inch wire and grip each wire equally without damage to either. The tilting action is accomplished by the multi-shouldered underside of the screw head 28, i.e., the annulets 35-37 resting at different levels or steps inside the plate so that both sides always bear on solid mutual surfaces. Further, the plate 31 is equipped with a chamfer as at 47 around its inner perimeter as well as a corresponding chamfer 64 (see FIG. 10) about its outer perimeter which also assists in leading the wire W to a stabilized position under the clamping plate 31.

Another feature adding to the tiltability of the inventive plate and screw combination is the ribbed bearing areas loaded by the two shoulders of the screw underhead surface and which will accept the screw shoulder load of tightening and will thus deflect, because of its relative "sharpness" into a much improved mating surface when tilted with one wire clamped under one side only of the plate 31.

The plate 31 itself has identical wire grip patterns on both sides, identical hole contours on both sides, therefore when being assembled it need not be oriented "right side up" and thus feeds more than twice as fast as other contoured plates so is potentially less expensive, faster assembled and easier to deliver. Because the gripping contours are alternated, in, out, and side-by-side, the original material thickness of 0.046 inch in the specific illustration given of the No. 6 clamping assembly increases to approximately 0.060 inch which results in a 33% raised coin and 50% total coined grip.

While in the foregoing specification a detailed description of the invention has been set down for the purpose of illustration, many variations of the details hereingiven may be made by those skilled in the art without departing from the spirit and scope of the invention.

I claim:
1. A tilting terminal clamp comprising:
    a threaded shank having a head at one extremity and an entering end portion at the other extremity, said head being configured to cooperate with a tool whereby the shank may be rotated into or out of a threaded aperture,
    a clamping plate having a central aperture adapted to receive said shank, said aperture having a size and configuration such as to permit said plate to teeter on said shank and to permit independent relative rotation of said plate and said shank, said plate having a generally circular perimeter with said perimeter being equipped with circumferentially spaced apart serrations adapted to engage the side wall of a terminal body pocket receiving said clamp to prevent rotation of said clamping plate, and
    means for retaining said plate on said shank adjacent said head.
2. A tilting terminal clamp comprising:
    a threaded shank having a head at one extremity and an entering end portion at the other extremity, said head being configured to cooperate with a tool whereby the shank may be rotated into or out of a threaded aperture, said shank adjacent said head being equipped with a plurality of annulets of decreasing diameter proceeding away from said head,
    a clamping plate substantially centrally apertured to loosely and teeterably receive said shank, said plate having a generally circular perimeter with said perimeter being equipped with circumferentially spaced apart serrations adapted to engage the side wall of a terminal body pocket receiving said clamp to prevent rotation of said clamping plate, said plte adjacent the central aperture thereof being equipped with a generally circular chamfer to engage different of said annulets on opposite sides of said shank when said plate is in a teetered condition within a terminal body pocket, and
    means for retaining said plate on said shank adjacent said head.
3. The structure of claim 2 in which said plate has two faces with radial ribs on each face, the ribs on one face being interposed between the ribs on the other face.
4. The structure of claim 2 in which said plate is equipped with identical chamfers on both faces and both adjacent said central aperture and said periphery.
5. The structure of claim 2 in which said head is equipped with a central opening configured to cooperate with a tool for rotating the shank relative to a threaded aperture, said opening being generally square in cross section but enlarged along corresponding sides adjacent each corner to enable the driving tool to rock slightly at tightening torque to facilitate tool removal.
6. The structure of claim 2 in which said serrations are ribs extending generally parallel to the axis of said shank whereby said ribs are adapted to cooperate with similarly contoured ribs in said sidewall.
7. The structure of claim 2 in which said plate at least on the face thereof remote from said head is equipped with wedge shaped indentations spaced radially outwardly of said chamfer, said face being equipped with a plurality of integral, radially extending ribs between said indentations and adapted to bitingly engage a wire clamped by said plate within a terminal body pocket.
8. The structure of claim 7 in which the other face of said plate is also equipped with wedge shaped indentations having apices radially spaced from the apices of the indentations in the first mentioned face, said other face also being equipped with a plurality of integral, radially extending ribs between the indentations thereof whereby said plate is mountable on said shank with either face thereof in confronting relation to said head.
9. The structure of claim 2 in which said shank is equipped with an additional annulet spaced from said plurality of annulets, said additional annulet being interrupted at circumferentially spaced areas and constituting said means for retaining said plate on said shank adjacent said head.
10. The structure of claim 9 in which said additional annulet in the interrupted portions thereof has a diameter greater than the minor diameter of the threads on said shank.
11. A tilting terminal clamp assembly comprising
    a terminal body equipped with a wire-receiving pocket having opposed generally parallel sidewalls and an end wall all upstanding from a terminal plate, said terminal plate being equipped with a threaded aperture for the receipt of the shank of a terminal clamp screw, said sidewalls being equipped with elongated, generally vertically ex- tending ribs said pocket being open at the top thereof for receipt of said terminal clamp and at one end for receipt of said wire, said terminal clamp including a threaded shank integral with a head for rotating said shank, said shank being threadably received in said threaded aperture, a clamping plate centrally apertured and rockably mounted on said shank adjacent said head, said plate having a generally circular perimeter with said perimeter being equipped with vertically extending rib means engaged with said sidewall ribs to prevent rotation of said clamping plate, and a wire between said clamping plate and said bottom wall and urged thereagainst by said tilting terminal clamp.

12. The structure of claim 11 in which said shank adjacent said head is equipped with a plurality of annulets of decreasing diameter in proceeding away from said head, said plate adjacent the central aperture thereof being equipped with a generally circular chamfer whereby said plate is adapted to engage different annulets on opposite sides of said shank and when bearing on said bottom wall and wire enters into a four point contact.

* * * * *